United States Patent
Kurokawa

(10) Patent No.: US 10,640,633 B2
(45) Date of Patent: May 5, 2020

(54) THERMOPLASTIC ELASTOMER COMPOSITION

(71) Applicant: Sumitomo Chemical Company, Limited, Tokyo (JP)

(72) Inventor: Ryosuke Kurokawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 61 days.

(21) Appl. No.: 15/978,735

(22) Filed: May 14, 2018

(65) Prior Publication Data

US 2018/0334556 A1 Nov. 22, 2018

(30) Foreign Application Priority Data

May 19, 2017 (JP) ................. 2017-099569

(51) Int. Cl.

| C08L 23/06 | (2006.01) |
|---|---|
| C08L 23/08 | (2006.01) |
| C08L 23/12 | (2006.01) |
| C08L 53/00 | (2006.01) |
| C08J 3/00 | (2006.01) |

(52) U.S. Cl.
CPC ............. *C08L 23/06* (2013.01); *C08J 3/005* (2013.01); *C08L 23/083* (2013.01); *C08L 23/0815* (2013.01); *C08L 23/12* (2013.01); *C08L 53/005* (2013.01); *C08J 2323/06* (2013.01); *C08J 2323/08* (2013.01); *C08J 2323/12* (2013.01); *C08L 2205/035* (2013.01); *C08L 2207/04* (2013.01); *C08L 2312/00* (2013.01)

(58) Field of Classification Search
CPC .... C08L 23/083; C08L 23/12; C08L 23/0815; C08L 23/06; C08L 23/04; C08L 53/00; C08L 23/14; C08L 2205/035; C08L 23/08
See application file for complete search history.

(56) References Cited

U.S. PATENT DOCUMENTS

| 7,579,408 B2 * | 8/2009 | Walton ................. C08L 23/06 525/191 |
|---|---|---|
| 2003/0100659 A1 | 5/2003 | Tasaka et al. |
| 2006/0073351 A1 | 4/2006 | Natsuyama et al. |
| 2008/0281046 A1 * | 11/2008 | Mori ................. C08L 23/04 525/88 |
| 2009/0192250 A1 | 7/2009 | Ijichi et al. |
| 2009/0291285 A1 * | 11/2009 | Suzuki .................. B32B 27/32 428/220 |
| 2011/0313107 A1 * | 12/2011 | Shan ................. C08L 23/10 525/88 |
| 2011/0313108 A1 * | 12/2011 | Shan ................. C08L 23/10 525/95 |
| 2013/0213548 A1 | 8/2013 | Natsuyama |
| 2014/0343229 A1 * | 11/2014 | Weeks ................. C08L 23/06 525/125 |
| 2015/0191590 A1 | 7/2015 | Mikami et al. |

FOREIGN PATENT DOCUMENTS

| JP | 2000281845 A | 10/2000 |
|---|---|---|
| JP | 2006131878 A | 5/2006 |
| JP | 2008543978 A | 12/2008 |
| JP | 2014077128 A | 5/2014 |

OTHER PUBLICATIONS

Extended European Search Report dated Sep. 19, 2018 in EP Application No. 18172236.4.

* cited by examiner

*Primary Examiner* — Jeffrey C Mullis
(74) *Attorney, Agent, or Firm* — Panitch Schwarze Belisario & Nadel LLP

(57) ABSTRACT

A thermoplastic elastomer composition contains components (A), (B), (C), and (D), wherein the weight ratio of component (C) to component (D) is ≥0.1 and <2, component (A) is an ethylene random copolymer containing ≥50% and ≤90% of a monomer unit derived from ethylene by weight relative to the component (A) and a monomer unit derived from at least one monomer selected from the group consisting of α-olefins having a number of carbon atoms of ≥3 and ≤10, component (B) is a polymer containing >50% and ≤100% of a monomer unit derived from propylene by weight relative to the component (B), component (C) is a copolymer containing an ethylene polymerization block and an ethylene-α-olefin copolymerization block, and component (D) is an ethylene polymer containing >90% and ≤100% of a monomer unit derived from ethylene by weight relative to the component (D).

6 Claims, No Drawings

THERMOPLASTIC ELASTOMER COMPOSITION

CROSS-REFERENCE TO RELATED APPLICATION

This application claims priority from Japanese Patent Application No. 2017-099569 filed in Japan on May 19, 2017, the disclosure of which is incorporated herein.

TECHNICAL FIELD

The present invention relates to a thermoplastic elastomer composition.

BACKGROUND ART

A thermoplastic elastomer composition obtained by melt-kneading a composition comprising an ethylene random copolymer rubber and a propylene polymer is used in the various fields of automobile parts, various industrial parts, and various architectural materials by taking advantage of its flexibility. For example, Patent Document 1 describes a thermoplastic elastomer composition obtained by dynamically heat-treating an ethylene-α-olefin copolymer rubber and a propylene polymer in the presence of a crosslinking agent.

PRIOR ART DOCUMENT

Patent Document

[Patent Document 1] JP-A No. 2000-281845

SUMMARY OF THE INVENTION

In recent years, there has been a growing demand for a composite molded body in which molded bodies comprising a thermoplastic elastomer composition are welded with each other and a composite molded body in which a molded body comprising a thermoplastic elastomer composition and a molded body comprising an ethylene polymer are welded with each other due to diversification of the design of automobiles. Adhesiveness of a molded body comprising a conventional thermoplastic elastomer composition to a molded body comprising an ethylene polymer is not sufficient though adhesiveness of a molded body comprising a conventional thermoplastic elastomer composition with each other is good.

In view of such actual state, the problem to be solved by the present invention is to provide a thermoplastic elastomer composition showing excellent adhesiveness to both a thermoplastic elastomer molded body and a molded body comprising an ethylene polymer, and a molded body comprising the thermoplastic elastomer composition.

The present invention includes inventions described in the [1] to [10].

[1] A thermoplastic elastomer composition comprising the following components (A), (B), (C) and (D),
wherein the weight ratio of the component (C) to the component (D) is 0.1 or more and less than 2.
Component (A): an ethylene random copolymer comprising a monomer unit derived from ethylene in amount of 50% by weight or more and 90% by weight or less when the total amount of the ethylene random copolymer is 100% by weight and a monomer unit derived from at least one monomer selected from the group consisting of α-olefins having a number of carbon atoms of 3 or more and 10 or less,
Component (B): a polymer comprising over 50% by weight and 100% by weight or less of a monomer unit derived from propylene when the total amount of the polymer is 100% by weight,
Component (C): a copolymer comprising an ethylene polymerization block and an ethylene-α-olefin copolymerization block.
Component (D): an ethylene polymer comprising over 90% by weight and 100% by weight or less of a monomer unit derived from ethylene when the total amount of the ethylene polymer is 100% by weight.

[2] The thermoplastic elastomer composition according to [1], wherein a gel fraction of the component (A) is over 10% by weight.

[3] A thermoplastic elastomer composition produced by melt-kneading the following components (A-2), (B), (C), (D) and (E),
wherein the weight ratio of the component (C) to the component (D) is 0.1 or more and less than 2.
Component (A-2): an ethylene random copolymer comprising a monomer unit derived from ethylene in amount of 50% by weight or more and 90% by weight or less and a monomer unit derived from at least one monomer selected from the group consisting of α-olefins having a number of carbon atoms of 3 or more and 10 or less when the total amount of the ethylene random copolymer is 100% by weight, and
wherein a gel fraction of the ethylene random copolymer is 10% by weight or less.
Component (B) a polymer comprising over 50% by weight and 100% by weight or less of a monomer unit derived from propylene when the total amount of the polymer is 100% by weight.
Component (C) an olefin-based block copolymer comprising an ethylene polymerization block and an ethylene-α-olefin copolymerization block,
Component (D): a polymer comprising over 90% by weight and 100% by weight or less of a monomer unit derived from ethylene when the total amount of the polymer is 100% by weight.
Component (E): a crosslinking agent.

[4] A thermoplastic elastomer composition according to claim 3, wherein the weight ratio of the component (E) before melt-kneading to the component (A-2) before melt-kneading is 0.001 or more and 0.3 or less.

[5] A thermoplastic elastomer composition produced by melt-kneading the following components (A-2), (B) and (E) to obtain a composition, and then melt-kneading the composition and the following components (C) and (D).
Component (A-2): an ethylene random copolymer comprising a monomer unit derived from ethylene in amount of 50% by weight or more and 90% by weight or less when the total amount of the ethylene random copolymer is 100% by weight and a monomer unit derived from at least one monomer selected from the group consisting of α-olefins having a number of carbon atoms of 3 or more and 10 or less,
wherein a gel fraction of the ethylene random copolymer is 10% by weight or less,
Component (B): a polymer comprising over 50% by weight and 100% by weight or less of a monomer unit derived from propylene when the total amount of the polymer is 100% by weight.

Component (E): a crosslinking agent
Component (C): an olefin-based block copolymer comprising an ethylene polymerization block and an ethylene-α-olefin copolymerization block.
Component (D): a polymer comprising over 90% by weight and 100% by weight or less of a monomer unit derived from ethylene when the total amount of the polymer is 100% by weight.

[6] A thermoplastic elastomer composition according to any one of [1] to [5], wherein the weight of gel thermoplastic elastomer is 5% or more.

[7] A process for producing a thermoplastic elastomer composition, comprising a step of melt-kneading the following the components (A-2), (B), (C), (D) and (E).
Component (A-2): an ethylene random copolymer comprising of a monomer unit derived from ethylene in amount of 50% by weight or more and 90% by weight or less when the total amount of the ethylene random copolymer is 100% by weight and a monomer unit derived from at least one monomer selected from the group consisting of α-olefins having a number of carbon atoms of 3 or more and 10 or less, wherein a gel fraction of the ethylene random copolymer is 10% by weight or less.
Component (B): a polymer having over 50% by weight and 100% by weight or less of a monomer unit derived from propylene (wherein, the total amount of the polymer is 100% by weight),
Component (C): an olefin-based block copolymer comprising an ethylene polymerization block and an ethylene-α-olefin copolymerization block,
Component (D): a polymer comprising over 90% by weight and 100% by weight or less of a monomer unit derived from ethylene when the total amount of the polymer is 100% by weight.
Component (E): a crosslinking agent.

[8] A process for producing a thermoplastic elastomer composition, comprising the following steps (1) and (2).
Step (1): a step of melt-kneading the following components (A-2), (B) and (E) to obtain a composition.
Step (2): a step of melt-kneading the composition produced by the step (1) and the following components (C) and (D).
Component (A-2): an ethylene random copolymer comprising a monomer unit derived from ethylene in amount of 50% by weight or more and 90% by weight or less when the total amount of the ethylene random copolymer is 100% by weight and a monomer unit derived from at least one monomer selected from the group consisting of α-olefins having a number of carbon atoms of 3 or more and 10 or less, wherein a gel fraction of the ethylene random copolymer is 10% by weight or less,
Component (B): a polymer comprising over 50% by weight and 100% by weight or less of a monomer unit derived from propylene when the total amount of the polymer is 100% by weight.
Component (E): a crosslinking agent
Component (C): an olefin-based block copolymer comprising an ethylene polymerization block and an ethylene-α-olefin copolymerization block.
Component (D): a polymer comprising over 90% by weight and 100% by weight or less of a monomer unit derived from ethylene when the total amount of the polymer is 100% by weight.

[9] A molded body comprising the thermoplastic elastomer composition according to any one of [1] to [6].

[10] An automobile part comprising the molded body according to [9].

Effect of the Invention

According to the present invention, a thermoplastic elastomer composition showing excellent adhesiveness to both a thermoplastic elastomer molded body and a molded body comprising an ethylene polymer, and a molded body comprising the thermoplastic elastomer composition can be provided.

DETAILED DESCRIPTION OF THE INVENTION

Definition

In the present specification, "α-olefin" denotes an olefin in which a carbon-carbon double bond is located at the α position.

In the present specification, "propylene polymer" denotes a polymer containing a monomer unit derived from propylene in an amount of over 50% by weight when the total weight of the polymer is 100% by weight).

In the present specification, "ethylene polymer" denotes a polymer containing a monomer unit derived from ethylene in an amount of 50% by weight or more when the total weight of the polymer is 100% by weight.

In the present specification, the term "ethylene polymerization block" denotes a portion constituting a copolymer and consisting of two or more consecutive monomer units derived from ethylene.

In the present specification, "ethylene-α-olefin copolymerization block" denotes a portion constituting a copolymer and consisting of at least one monomer unit derived from ethylene and at least one monomer unit derived from an α-olefin having a number of carbon atoms of 3 or more.

In the present specification, "thermoplastic elastomer composition" denotes a composition comprising a blend of a thermoplastic resin in an amount sufficient to impart thermoplasticity and a rubber in an amount sufficient to impart rubber elasticity in which the thermoplastic resin consisting of at least a continuous phase (matrix phase) and at least the rubber is present as a discontinuous phase (domain phase).

<Component (A)>

The component (A) is an ethylene random copolymer having 50% by weight or more and 90% by weight or less of a monomer unit derived from ethylene when the total amount of the ethylene random copolymer is 100% by weight and a monomer unit derived from at least one monomer selected from the group consisting of α-olefins having a number of carbon atoms of 3 or more and 10 or less. The component (A) may also have a monomer unit derived from a monomer other than ethylene and α-olefins having a number of carbon atoms of 3 or more and 10 or less.

The α-olefin having a number of carbon atoms of 3 or more and 10 or less includes propylene, 1-butene, 2-methylpropene, 1-pentene, 3-methyl-1-butene, 1-hexene, 4-methyl-1-pentene, and 1-octene. The monomer unit derived from at least one selected from the group consisting of α-olefins having a number of carbon atoms of 3 or more and 10 or less is more preferably a monomer unit derived from propylene, a monomer unit derived from 1-butene or a monomer unit derived from 1-octene.

The content of a monomer unit derived from ethylene in the component (A) is 50% by weight or more and 90% by weight or less, preferably 55% by weight or more and 85% by weight or less, more preferably 60% by weight or more and 75% by weight or less when the total amount of the ethylene random copolymer is 100% by weight. The content of a monomer unit derived from at least one selected from the group consisting of α-olefins having a number of carbon atoms of 3 or more and 10 or less in the component (A) is 10% by weight or more and 50% by weight or less, preferably 15% by weight or more and 45% by weight or less, more preferably 25% by weight or more and 40% by weight or less when the total amount of the ethylene random copolymer is 100% by weight.

The content of a monomer unit derived from ethylene and the content of a monomer unit derived from at least one monomer selected from the group consisting of α-olefins having a number of carbon atoms of 3 or more and 10 or less in the component (A) can be determined by infrared spectroscopy. Specifically, using an infrared spectrophotometer, the infrared absorption spectrum of the component (A) is measured, and the content of a monomer unit derived from ethylene and the content of a monomer unit derived from at least one monomer selected from the group consisting of α-olefins having a number of carbon atoms of 3 or more and 10 or less are calculated according to a method described in "Die Makromolekulare Chemie, 177, 461 (1976) written by McRae, M. A., Madams, W. F., et al.".

The component (A) may also have a monomer unit derived from a monomer other than at least one selected from the group consisting of ethylene and α-olefins having a number of carbon atoms of 3 or more and 10 or less. The other monomer includes conjugated dienes having a number of carbon atoms of 4 or more and 8 or less such as 1,3-butadiene, 2-methyl-1,3-butadiene, 1,3-pentadiene, and 2,3-dimethyl-1,3-butadiene; non-conjugated dienes having a number of carbon atoms of 5 or more and 15 or less such as dicyclopentadiene, 5-ethylidene-2-norbornene, 1,4-hexadiene, 1,5-dicyclooctadiene, 7-methyl-1,6-octadiene, and 5-vinyl-2-norbornene; carboxylic acid vinyl esters such as vinyl acetate; unsaturated carboxylic acid esters such as methyl acrylate, ethyl acrylate, butyl acrylate, methyl methacrylate, and ethyl methacrylate; unsaturated carboxylic acids such as acrylic acid and methacrylic acid; etc. The other monomer is preferably a non-conjugated diene having a number of carbon atoms of 5 or more and 15 or less, more preferably 5-ethylidene-2-norbornene or dicyclopentadiene. The component (A) may contain two or more kinds of the monomer units derived from the other monomers.

The content of the monomer unit derived from the other monomer is preferably 30% by weight or less, more preferably 20% by weight or less when the total amount of the component (A) is 100% by weight. The content of the monomer unit derived from the other monomer can be determined by infrared spectroscopy. Specifically, using an infrared spectrophotometer, the peak intensity of a peak derived from the other monomer of the component (A) is measured, and the content of the monomer unit derived from the other monomer in the component (A) is calculated from the peak intensity. The content of the monomer unit derived from the other monomer in the component (A-1) and the component (A-2) can also be determined by the same manner.

The component (A) includes an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, an ethylene-propylene-dicyclopentadiene copolymer, an ethylene-propylene-1,4-hexadiene copolymer, and an ethylene-propylene-5-vinyl-2-norbornene copolymer. The component (A) may be used one kind of or two or more kinds of the ethylene random copolymers may be used. The component (A) is preferably an ethylene-propylene copolymer or an ethylene-propylene-5-ethylidene-2-norbornene copolymer.

The component (A-1) is the component (A) of which the gel fraction is over 10% by weight. The component (A-2) is the component (A) of which the gel fraction is 10% by weight or less.

The higher the content of the component (A) having a crosslinked structure is, the larger the gel fraction is. The gel fraction of the component (A-1) is preferably 20% by weight or more, more preferably 40% by weight or more.

The component (A-1) can be obtained by crosslinking the component (A-2).

The gel fraction of the component (A-1) can be determined by the following method.

Raw material of the thermoplastic elastomer comprising the component (A-2) is melt-kneaded to obtain a thermoplastic elastomer. The gel fraction is measured with a Soxhlet extractor in which an extraction tube is connected to the lower part of a reflux condenser and a flask is connected to the lower part of the extraction tube. About 1 g of the thermoplastic elastomer composition and a net basket(X) fabricated from wire mesh having a sieve opening of 400 mesh are weighed, respectively. The net basket into which the thermoplastic elastomer composition is put is introduced to the extraction tube. Three hundred ml of o-xylene is introduced into the flask. The flask is heated, and o-xylene is reflexed for 24 hours to conduct extraction. After extraction, the net basket is picking up the extraction tube, and dried under reduced pressure at 100° C. in a vacuum drying machine, and the net basket after drying(Y) is weighed. The gel fraction (% by weight) is calculated according to the following formula.

$$\text{gel fraction} = ((\text{weight of }(Y)) - (\text{weight of }(X))/\text{weight of }(A\text{-}2)\text{ per 1 g of the thermoplastic elastomer}) \times 100$$

A process for crosslinking the component (A-2) includes a process for melt-kneading a composition containing the component (A-2) and the component (E) described in the following. Crosslinking may be conducted simultaneously in melt-kneading the thermoplastic elastomer, and in this case, a composition containing the component (A-1) and a component (B) can be produced by melt-kneading a composition containing the component (A-2), a component (B) described later and a crosslinking agent (E), and details thereof are as described below.

The gel fraction of the component (A-2) is preferably 5% by weight or less, more preferably 0% by weight.

It is preferable that the component (A-2) has substantially no crosslinkable structure.

The Mooney viscosity ($ML_{1+4}$ 100° C.) measured at 100° C. of the component (A-2) is preferably 5 or more and 300 or less, more preferably 10 or more and 200 or less. The Mooney viscosity ($ML_{1+4}$ 100° C.) is measured according to JIS K6300, and "$ML_{1+4}$ 100° C." has the following meaning.

M: Mooney viscosity
L: Large rotor is used
100° C.: measurement temperature
1+4: value measured when a rotor is rotated for 4 minute at 2 rpm after heating a sample for 1 minute The intrinsic viscosity measured in tetralin at 135° C. of the component (A-2) is preferably 0.5 dl/g or more and 8 dl/g or less, more preferably 1 dl/g or more and 6 dl/g or less.

The reduced viscosity is measured in tetralin at 135° C. using a Ubbelohde type viscometer, and the intrinsic viscosity is determined by an extrapolation method according to a calculation method described in "Polymer Solution, Polymer Experiment, Kobunshi Jikkengaku, 11" published by Kyoritsu Shuppan Co., Ltd., 1982 p. 491.

It is preferable that the component (A-2) has no crystal melting peak in the temperature range of 110° C. or more and 1250° C. or less. It is preferable for the component (A-2) that the crystal melting heat quantity thereof in the temperature range of 110° C. or more and 125° C. or less is 10 J/g or less.

The process for producing the component (A-2) includes a process for copolymerizing ethylene and at least one monomer selected from the group consisting of α-olefins having a number of carbon atoms of 3 or more and 10 or less in the presence of a known complex type catalyst such as a Ziegler-Natta type catalyst, a metallocene type complex, and a non-metallocene type complex. The polymerization method includes a slurry polymerization method, a solution polymerization method, a bulk polymerization method, and a gas-phase polymerization method.

<Component (B)>

The component (B) may also have a monomer unit derived from a monomer other than propylene.

The monomer other than propylene includes ethylene and α-olefins having a number of carbon atoms of 4 or more, and preferable are ethylene and α-olefins having a number of carbon atoms of 4 or more and 20 or less.

The α-olefin having a number of carbon atoms of 4 or more and 20 or less includes 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene.

The content of a monomer unit derived from propylene, the content of a monomer unit derived from ethylene and the content of a monomer unit derived from at least one monomer selected from the group consisting of α-olefins having a number of carbon atoms of 4 or more, in the component (B), can be determined by the same method as for the content of each monomer unit in the component (A).

The component (B) includes a propylene homopolymer, a propylene random copolymer, and a heterophasic propylene polymerization material. The thermoplastic elastomer composition may contain only one kind of the component (B) or two or more kinds thereof.

The propylene random copolymer includes (1) a propylene-ethylene random copolymer in which the content of a monomer unit derived from propylene is 90% by weight or more and 99.5% by weight or less and the content of a monomer unit derived from ethylene is 0.5% by weight or more and 10% by weight or less when the total amount of a monomer unit derived from propylene and a monomer unit derived from ethylene is 100% by weight;

(2) a propylene-ethylene-α-olefin random copolymer in which the content of a monomer unit derived from propylene unit is 81% by weight or more and 99% by weight or less, the content of a monomer unit derived from ethylene is 0.5% by weight or more and 9.5% by weight or less and the content of a monomer unit derived from an α-olefin having a number of carbon atoms of 4 or more and 10 or less is 0.5% by weight or more and 9.5% by weight or less when the total amount of a monomer unit derived from propylene, a monomer unit derived from ethylene and a monomer unit derived from an α-olefin having a number of carbon atoms of 4 or more and 10 or less is 100% by weight; and (3) a propylene-α-olefin random copolymer in which the content of a monomer unit derived from propylene is 90% by weight or more and 99.5% by weight or less and the content of a monomer unit derived from an α-olefin having a number of carbon atoms of 4 or more and 10 or less is 0.5% by weight or more and 10% by weight or less when the total amount of a monomer unit derived from propylene and a monomer unit derived from an α-olefin having a number of carbon atoms of 4 or more and 10 or less is 100% by weight.

The α-olefin having a number of carbon atoms of 4 or more and 10 or less in the (1) and (2) includes linear α-olefins such as 1-butene, 1-pentene, 1-hexene, 1-octene, and 1-decene; and branched α-olefins such as 3-methyl-1-butene, and 3-methyl-1-pentene. In preparation of the (1) and (2), the α-olefin having a number of carbon atoms of 4 or more and 10 or less may be used one kind of or two or more kinds of the α-olefins may be used.

The process for producing the propylene homopolymer and the propylene random copolymer includes a process for polymerizing propylene in the presence of a complex type catalyst such as a Ziegler-Natta catalyst, a metallocene complex, and a non-metallocene complex. The polymerization method includes a slurry polymerization method, a solution polymerization method, a bulk polymerization method, and a gas-phase polymerization method.

The heterophasic propylene polymerization material comprises the following copolymer (I) and (II). The heterophasic propylene polymerization material is a mixture comprising a structure in which the copolymer (II) is dispersed in a matrix of the polymer (I), and comprises 50% by weight or more of a monomer unit derived from propylene when the total amount of the heterophasic propylene polymerization material is 100% by weight. The copolymer (II) is a copolymer comprising 20% by weight or more and 90% by weight or less of a monomer unit derived from ethylene and a monomer unit derived from at least one monomer selected from the group consisting of α-olefins having a number of carbon atoms of 3 or more when the total weight of the copolymer is 100% by weight. The polymer (I) is a polymer comprising over 80% by weight and 100% or less of a monomer unit derived from propylene when the total weight of the polymer is 100% by weight.

The content of the polymer (I) contained in the heterophasic propylene polymerization material is preferably 70% by weight or more and 90% by weight or less, more preferably 75% by weight or more and 90% by weight or less when the total amount of the heterophasic propylene polymerization material is 100% by weight. The content of the copolymer (II) contained in the heterophasic propylene polymerization material is preferably 10% by weight or more and 30% by weight or less, more preferably 10% by weight or more and 25% by weight or less when the total amount of the heterophasic propylene polymerization material is 100% by weight.

The α-olefin having a number of carbon atoms of 3 or more in the copolymer (II) includes propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The α-olefin having a number of carbon atoms of 3 or more is preferably an α-olefin having a number of carbon atoms of 3 or more and 20 or less, more preferably an α-olefin having a number of carbon atoms of 3 or more and 10 or less, still more preferably propylene, 1-butene, 1-hexene or 1-octene. In the copolymer (II), the α-olefin having a number of carbon atoms of 3 or more may be used one kind of or two or more kinds of the α-olefins may be used.

The content of the monomer unit derived from ethylene contained in the copolymer (II) is preferably 22% by weight or more and 80% by weight or less, more preferably 25% by weight or more and 70% by weight or less, still more preferably 27% by weight or more and 60% by weight or less when the total amount of a monomer unit derived from at least one selected from the group consisting of α-olefins having a number of carbon atoms of 3 or more and a monomer unit derived from ethylene is 100% by weight. The content of the monomer unit derived from at least one monomer selected from the group consisting of α-olefins having a number of carbon atoms of 3 or more contained in the copolymer (II) is preferably 20% by weight or more and 78% by weight or less, more preferably 30% by weight or more and 75% by weight or less, still more preferably 40% by weight or more and 73% by weight or less when the total amount of a monomer unit derived from at least one monomer selected from the group consisting of α-olefins having a number of carbon atoms of 3 or more and a monomer unit derived from ethylene is 100% by weight.

The copolymer (II) includes a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer, and preferable is a propylene-ethylene copolymer or a propylene-ethylene-1-butene copolymer. The copolymer (II) is usually a random copolymer.

A process for producing the heterophasic propylene polymerization material includes a process for multistage-polymerizing monomers comprising propylene and ethylene in the presence of a polymerization catalyst, and a process comprises a first step of polymerizing monomers comprising propylene in the presence of a polymerization catalyst to obtain the polymer (I) and second step of copolymerizing ethylene and at least one monomer selected from the group consisting of α-olefins having a number of carbon atoms of 3 or more in the presence of the resultant polymer (I) to produce a copolymer (II). The polymerization catalyst used for producing the heterophasic propylene polymerization material includes a Ziegler catalyst a Ziegler-Natta catalyst, a catalyst comprising an alkylaluminoxane and a compound of a transition metal belonging to group 4 of the periodic table having a cyclopentadienyl ring, and a catalyst comprising a compound of a transition metal belonging to group 4 of the periodic table having a cyclopentadienyl group, a compound reacting with the transition metal compound to form an ionic complex and an organoaluminum compound. A pre-polymerization catalyst may be used in the presence of the polymerization catalyst. The pre-polymerization catalyst includes catalysts described in JP-A No. Sho-61-218606, JP-A No. Sho-61-287904, JP-A No. Hei-5-194685, JP-A No. Hei-7-216017, JP-A No. Hei-9-316147, JP-A No. Hei-10-212319 and JP-A No. 2004-182981.

The polymerization method of producing for the heterophasic propylene polymerization material includes bulk polymerization, solution polymerization, slurry polymerization, and gas phase polymerization. The inactive hydrocarbon solvent used in solution polymerization and slurry polymerization includes propane, butane, isobutane, pentane, hexane, heptane, and octane. Two or more of these polymerization methods may be combined, and the polymerization method may be any of batch mode or continuous mode. The polymerization method of producing the heterophasic propylene polymerization material is preferably continuous mode gas phase polymerization and bulk-gas phase polymerization wherein is bulk polymerization and gas phase polymerization continuously performed.

The melt flow rate, hereinafter referred to as "MFR", of the component (B) measured under conditions of a temperature of 230° C. and a load of 21.18 N according to JIS K7210 is preferably 0.1 g/10 min or more and 150 g/10 min or less, more preferably 0.1 g/10 min or more and 50 g/10 min or less, still more preferably 0.2 g/10 min or more and 15 g/10 min or less, from the standpoint of adhesiveness to both a thermoplastic elastomer molded body and a molded body comprising an ethylene polymer.

The component (B) is preferably a propylene homopolymer, a propylene-ethylene random copolymer, a propylene-ethylene-1-butene random copolymer or a heterophasic propylene polymerization material, more preferably a propylene homopolymer, an ethylene-propylene random copolymer or a heterophasic propylene polymerization material.

<Component (C)>

In the component (C), an ethylene polymerization block and an ethylene-α-olefin copolymerization block are bonded by covalent bond.

The thermoplastic elastomer composition may contain singly or two or more kinds of the components (C).

The component (C) has a crystal melting peak in the temperature range of 110° C. or more and 125° C. or less, and the crystal melting heat quantity of the crystal melting peak is preferably 20 J/g or more and 60 J/g or less, more preferably 30 J/g or more and 50 J/g or less. The crystal melting peak in the temperature range of 110° C. or more and 125° C. or less in the component (C) is derived from an ethylene polymerization block of the component (C).

The ethylene polymerization block in the component (C) may have a monomer unit derived from a monomer other than ethylene. The other monomer includes propylene, 1-butene, 2-methylpropene, 1-pentene, 3-methyl-1-butene, 1-hexene, 4-methyl-1-pentene, and 1-octene. The other monomer is preferably an α-olefin having a number of carbon atoms of 3 or more and 10 or less such as propylene, 1-butene, 1-hexene, and 1-octene. The ethylene polymerization block of the component (C) may contain singly or two or more kinds of the monomer units derived from the monomer other than ethylene.

The content of a monomer unit derived from ethylene in the ethylene polymerization block is preferably 95% by weight or more, more preferably 98% by weight or more when the total amount of the ethylene polymerization block is 100% by weight.

The ethylene-α-olefin copolymerization block is a copolymerization block having a monomer unit derived from ethylene and a monomer unit derived from an α-olefin having a number of carbon atoms of 3 or more. The α-olefin having a number of carbon atoms of 3 or more in the ethylene-α-olefin copolymerization block includes propylene, 1-butene, 2-methylpropene, 1-pentene, 3-methyl-1-butene, 1-hexene, 4-methyl-1-pentene, and 1-octene, and preferable are α-olefins having a number of carbon atoms of 3 or more and 10 or less such as propylene, 1-butene, 1-hexene, and 1-octene. The ethylene-α-olefin copolymerization block may contain only singly or two or more kinds of the monomer unit derived from an α-olefin having a number of carbon atoms of 3 or more.

The ethylene-α-olefin copolymerization block includes an ethylene-1-butene copolymerization block, an ethylene-1-hexene copolymerization block, an ethylene-1-octene copolymerization block, an ethylene-propylene-1-butene copolymerization block, an ethylene-propylene-1-hexene copolymerization block and an ethylene-propylene-1-octene copolymerization block. The ethylene-α-olefin copolymerization block is preferably an ethylene-1-octene copolymerization block.

The component (C) may contain singly or two or more kinds of the ethylene-α-olefin copolymerization blocks.

The content of a monomer unit derived from ethylene the ethylene-α-olefin copolymerization block is preferably less than 95% by weight, more preferably 90% by weight or less, still more preferably 60% by weight or less when the total amount of the ethylene-α-olefin copolymerization block is 100% by weight.

The ethylene-α-olefin copolymerization block may also have a monomer unit derived from a monomer other than ethylene and α-olefins having a number of carbon atoms of 3 or more. The other monomer includes non-conjugated dienes. The non-conjugated diene includes chain non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene. Preferable are 5-ethylidene-2-norbornene and dicyclopentadiene.

When the component (C) has a monomer unit derived from a monomer other than ethylene and α-olefins having a number of carbon atoms of 3 or more, the content is usually 10% by weight or less, preferably 5% by weight or less when the total amount of the component (C) is 100% by weight. The content of each monomer unit of the component (C) can be determined by infrared spectroscopy.

The content of the monomer unit derived from ethylene in the component (C) is 50% by weight or more and 90% by weight or less, preferably 55% by weight or more and 85% by weight or less, still more preferably 60% by weight or more and 75% by weight or less when the total amount of a monomer unit derived from ethylene and a monomer unit derived from at least one selected from the group consisting of α-olefins having a number of carbon atoms of 3 or more and 10 or less in the component (C) is 100% by weight. The content of the monomer unit derived from at least one monomer selected from the group consisting of α-olefins having a number of carbon atoms of 3 or more and 10 or less in the component (C) is 10% by weight or more and 50% by weight or less, preferably 15% by weight or more and 45% by weight or less, still more preferably 25% by weight or more and 40% by weight or less when the total amount of a monomer unit derived from ethylene and a monomer unit derived from at least one selected from the group consisting of α-olefins having a number of carbon atoms of 3 or more and 10 or less in the component (C) is 100% by weight.

The content of a monomer unit derived from ethylene and the content of a monomer unit derived from at least one selected from the group consisting of α-olefins having a number of carbon atoms of 3 or more and 10 or less in the component (C) can be determined by infrared spectroscopy.

The component (C) is preferably an olefin-based block copolymer containing an ethylene homopolymerization block and an ethylene-1-octene copolymerization block.

The glass transition temperature of the component (C) is preferably −80° C. or more and −50° C. or less, more preferably −75° C. or more and −60° C. or less. The glass transition temperature of the component (C) is derived from an ethylene-α-olefin copolymerization block. The glass transition temperature is determined by a DSC method.

The MFR of the component (C) measured according to JIS K7210 under conditions of a temperature of 190° C. and a load of 21.18 N is not particularly restricted, and it is 0.01 g/10 min or more and 10 g/10 min or less, preferably 0.05 g/10 min or more and 8 g/10 min or less, more preferably 0.10 g/10 min or more and 5 g/10 min or less.

The component (C) can be synthesized according to a method disclosed in National Publication of Translated Version No. 2007-529617, National Publication of Translated Version No. 2008-537563 and National Publication of Translated Version No. 2008-543978. For example, a composition containing a mixture or reaction product obtained by combining a first olefin polymerization catalyst, a second olefin polymerization catalyst capable of preparing a polymer having different chemical or physical properties from a polymer prepared with the first olefin polymerization catalyst under the equivalent polymerization conditions and a chain shuttling agent is prepared, and the component (C) can be produced via a step of bringing the α-olefin and ethylene into contact with the composition under addition polymerization conditions.

For polymerization of the component (C), a continuous solution polymerization method is preferably applied. In the continuous solution polymerization method, a catalyst component, a chain shuttling agent, monomers, and if necessary, a solvent, an auxiliary agent, a capture agent and a polymerization aid, are fed to the reaction zone continuously, and the polymer product is continuously taken out from the system. The length of a block can be changed by controlling the proportion and the kind of the catalyst, the proportion and the kind of the chain shuttling agent, and the polymerization temperature.

The other conditions for the synthesis method of the component (C) are disclosed in National Publication of Translated Version No. 2007-529617, National Publication of Translated Version No. 2008-537563 and National Publication of Translated Version No. 2008-543978. The commercially available correspondent products include, for example, Engage (registered trademark)-XLT series and INFUSE (registered trademark) series manufactured by The Dow Chemical Company.

<Component (D)>

The component (D) may also have a monomer unit derived from a monomer other than ethylene.

The monomer other than ethylene includes conjugated dienes having a number of carbon atoms of 4 or more and 8 or less such as an α-olefin having a number of carbon atoms of 3 or more and 10 or less, 1,3-butadiene, 2-methyl-1,3-butadiene, 1,3-pentadiene, and 2,3-dimethyl-1,3-butadiene; non-conjugated dienes having a number of carbon atoms of 5 or more and 15 or less such as dicyclopentadiene, 5-ethylidene-2-norbornene, 1,4-hexadiene, 1,5-dicyclooctadiene, 7-methyl-1,6-octadiene, and 5-vinyl-2-norbornene; carboxylic acid vinyl esters such as vinyl acetate; unsaturated carboxylic acid esters such as methyl acrylate, ethyl acrylate, butyl acrylate, methyl methacrylate, and ethyl methacrylate; unsaturated carboxylic acids such as acrylic acid, and methacrylic acid.

The component (D) includes an ethylene homopolymer and an ethylene copolymer having a monomer unit derived from ethylene and a monomer unit derived from a monomer other than ethylene. The ethylene copolymer as the component (D) may have only one kind of the monomer unit derived from a monomer other than ethylene or may have two or more kinds of the monomers units derived from a monomer other than ethylene. The component (D) is preferably an ethylene homopolymer, an ethylene-propylene copolymer, an ethylene-1-butene copolymer, an ethylene-1-pentene copolymer, an ethylene-4-methyl-1-pentene copolymer, an ethylene-1-hexene copolymer or the like, more preferably a high density polyethylene.

The MFR of the component (D) measured according to JIS K7210 under conditions of a temperature of 190° C. and a load of 21.18 N is not particularly restricted, and it is usually 0.01 g/10 min or more and 200 g/10 min or less, preferably 1.0 g/10 min or more and 100 g/10 min or less, more preferably 5 g/10 min or more and 30 g/10 min or less.

The density of the component (D) measured according to JIS K7112 is preferably 0.91 g/cm$^3$ or more and 0.97 g/cm$^3$ or less, more preferably 0.94 g/cm$^3$ or more and 0.97 g/cm$^3$ or less.

The component (D) can be produced by polymerizing ethylene in the presence of a polymerization catalyst such as a Ziegler-Natta catalyst, and a metallocene catalyst. The polymerization method includes a solution polymerization method, a bulk polymerization method, a slurry polymerization method, and a gas-phase polymerization method, and two or more kinds of these methods may be combined.

<Component (E)>

The component (E) includes organic peroxides, sulfur compounds, and alkylphenol resins, and organic peroxides are preferable.

The organic peroxide includes ketone peroxides, diacyl peroxides, hydroperoxides, dialkyl peroxides, peroxyketals, alkyl peresters, percarbonates, peroxy dicarbonates, and peroxy esters. The specific organic peroxides include dicumyl peroxide, 2,5-dimethyl-2,5-di(tert-butylperoxy) hexane, 2,5-dimethyl-2,5-di(tert-butylperoxy)hexine, 1,3-bis(tert-butylperoxyisopropyl)benzene, tert-butylcumyl peroxide, di-tert-butyl peroxide, 2,2,4-trimethylpentyl-2-hydroperoxide, diisopropylbenzohydroperoxide, cumene peroxide, tert-butyl peroxide, 1,1-di(tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide.

The organic peroxide may be used one kind of or two or more kinds of the organic peroxides may be used.

The component (E) may also be combined with a cross-linking aid for increasing the degree of cross-linkage of the component (A-1). The preferable crosslinking aid is a compound having two or more double bonds. The crosslinking aid includes peroxide crosslinking aids such as N,N'-m-phenylenebismaleimide, toluylenebismaleimide, p-quinonedioxime, nitrosobenzene, diphenylguanidine, and trimethylolpropane; and divinylbenzene, triallyl cyanurate, triallyl isocyanurate, ethylene glycol dimethacrylate, polyethylene glycol dimethacrylate, trimethylolpropane trimethacrylate, and allyl methacrylate, and preferable is trimethylolpropane trimethacrylate.

<Component (F)>

The component (F) is mineral oil. The thermoplastic elastomer composition may contain the component (F). The component (F) includes high boiling point fractions of petroleum having an average molecular weight of 300 or more and 1500 or less and having a flow point of 0° C. or less such as aromatic mineral oils, naphthenic mineral oils, and paraffinic mineral oils. Paraffinic mineral oils are preferable as the component (F).

The component (F) may be blended as an extender oil of the component (A-2). The process for of blending the component (F) into the component (A-2) includes a process for mechanically kneading the component (A-2) and the component (F) using a kneading apparatus such as rolls, and a Bunbury mixer, a process for adding a prescribed amount of the compound (F) into a solution of the compound (A-2) to obtain a mixed liquid, and then removing a solvent from the resultant mixed liquid by a method such as a spray drying method, a steam stripping method, and a supercritical drying method using carbon dioxide, and a process for adding an oil directly to a rubber in the form of latex and stirring the mixture, and then coagulating the rubber.

When the component (F) is blended as an extender oil of the component (A-2), the Mooney viscosity ($ML_{4+4}100°$ C.) measured at 100° C. of a composition comprising the component (F) and the component (A-2) is preferably 5 or more and 300 or less, more preferably 10 or more and 200 or less. The Mooney viscosity ($ML_{1+4}100°$ C.) is measured according to JIS K6300.

(Thermoplastic Elastomer Composition)

The thermoplastic elastomer composition comprises the components (A), (B), (C) and (D), wherein the weight ratio of the component (C) to the component (D) (weight of component (C)/weight of component (D)) is 0.1 or more and less than 2.

A gel fraction of the component (A) contained in the thermoplastic elastomer composition may be over 10% by weight.

The content of the component (A) in the thermoplastic elastomer composition is preferably 10 parts by weight or more and 80 parts by weight or less, more preferably 30 parts by weight or more and 70 parts by weight or less, still more preferably 40 parts by weight or more and 60 parts by weight or less with respect to 100 parts by weight of the total amount of the components (A), (B), (C) and (D), from the standpoint of adhesiveness to both a thermoplastic elastomer molded body and a molded body comprising an ethylene polymer.

The content of the component (B) in the thermoplastic elastomer composition is preferably 5 parts by weight or more and 50 parts by weight or less, more preferably 10 parts by weight or more and 40 parts by weight or less, still more preferably 15 parts by weight or more and 30 parts by weight or less with respect to 100 parts by weight of the total amount of the components (A), (B), (C) and (D), from the standpoint of adhesiveness to both a thermoplastic elastomer molded body and a molded body comprising an ethylene polymer.

The content of the component (C) in the thermoplastic elastomer composition is preferably 0.1 part by weight or more and 40 parts by weight or less, more preferably 3 parts by weight or more and 25 parts by weight or less, still more preferably 5 parts by weight or more and 20 parts by weight or less with respect to 100 parts by weight of the total amount of the components (A), (B), (C) and (D), from the standpoint of adhesiveness to both a thermoplastic elastomer molded body and a molded body comprising an ethylene polymer.

The content of the component (D) in the thermoplastic elastomer composition is preferably 0.1 part by weight or more and 50 parts by weight or less, more preferably 10 parts by weight or more and 40 parts by weight or less, still more preferably 20 parts by weight or more and 30 parts by weight or less with respect to 100 parts by weight of the total amount of the components (A), (B), (C) and (D), from the standpoint of adhesiveness to both a thermoplastic elastomer molded body and a molded body comprising ethylene polymer.

The weight ratio of the component (C) to the component (D) is preferably 0.2 or more and less than 1.5, more preferably 0.2 or more 1 or less, and still more preferably 0.25 or more and less than 1.0, from the standpoint of adhesiveness to both a thermoplastic elastomer molded body and a molded body comprising an ethylene polymer.

It is preferable that the total amount of the components (A), (B), (C) and (D) is 60% by weight or more when the total amount of the thermoplastic elastomer composition is 100% by weight.

A thermoplastic elastomer composition produced by melt-kneading the components (A-2), (B), (C), (D) and (E), wherein the weight ratio of the component (C) to the component (D) is 0.1 or more and less than 2.

The weight of the component (A-2) before melt-kneading is preferably 10 parts by weight or more and 80 parts by weight or less, more preferably 30 parts by weight or more and 70 parts by weight or less, still more preferably 40 parts by weight or more and 60 parts by weight or less with respect to 100 parts by weight of the total amount of the components (A-2), (B), (C) and (D) before melt-kneading, from the standpoint of adhesiveness to both a thermoplastic elastomer molded body and a molded body comprising an ethylene polymer.

The content of the component (B) in the thermoplastic elastomer composition is preferably 5 parts by weight or more and 50 parts by weight or less, more preferably 10 parts by weight or more and 40 parts by weight or less, still more preferably 15 parts by weight or more and 30 parts by weight or less with respect to 100 parts by weight of the total amount of the components (A-2), (B), (C) and (D) before melt-kneading, from the standpoint of adhesiveness to both a thermoplastic elastomer molded body and a molded body comprising an ethylene polymer.

The content of the component (C) in the thermoplastic elastomer composition is preferably 0.1 part by weight or more and 40 parts by weight or less, more preferably 3 parts by weight or more and 25 parts by weight or less, still more preferably 5 parts by weight or more and 20 parts by weight or less with respect to 100 parts by weight of the total amount of the components (A-2), (B), (C) and (D) before melt-kneading, from the standpoint of adhesiveness to both a thermoplastic elastomer molded body and a molded body comprising an ethylene polymer.

The content of the component (D) in the thermoplastic elastomer composition is preferably 0.1 part by weight or more and 50 parts by weight or less, more preferably 10 parts by weight or more and 40 parts by weight or less, still more preferably 20 parts by weight or more and 30 parts by weight or less with respect to 100 parts by weight of the total amount of the components (A-2), (B), (C) and (D) before melt-kneading, from the standpoint of adhesiveness to both a thermoplastic elastomer molded body and a molded body comprising an ethylene polymer.

The weight ratio of the component (C) to the component (D) is preferably 0.2 or more and less than 1.5, still more preferably 0.25 or more and less than 1.0, from the standpoint of adhesiveness to both a thermoplastic elastomer molded body and a molded body comprising an ethylene polymer.

The weight of the component (E) before melt-kneading is preferably 0.00.1 part by weight or more and 3 parts by weight or less, more preferably 0.1 part by weight or more and 2.5 parts by weight or less, still more preferably 0.2 parts by weight or more and 2 parts by weight or less with respect to 100 parts by weight of the total amount of the components (A-2), (B), (C) and (D) before melt-kneading, from the standpoint of adhesiveness to both a thermoplastic elastomer molded body and a molded body comprising an ethylene polymer.

When a crosslinking aid is used together with the component (E), the weight of the crosslinking aid before melt-kneading is preferably 0.0.1 part by weight or more and 10 parts by weight or less, more preferably 0.05 parts by weight or more and 2 parts by weight or less with respect to 100 parts by weight of the total amount of the components (A-2), (B), (C) and (D).

The weight ratio of the component (E) before melt-kneading to the component (A-2) before melt-kneading (weight of component (E)/weight of component (A-2)) is preferably 0.001 or more and 0.3 or less, more preferably 0.002 or more and 0.2 or less, still more preferably 0.003 or more and 0.01 or less, from the standpoint of adhesiveness to both a thermoplastic elastomer molded body and a molded body comprising an ethylene polymer.

It is preferable that the total amount of the component (A-2), the component (B), the component (C) and the component (D) before melt-kneading is 60% by weight or more when the total amount of the thermoplastic elastomer composition is 100% by weight.

The weight ratio of the component (C) to the component (B) (weight of component (C)/weight of component (B)) is preferably 0.1 or more and less than 2, more preferably 0.2 or more and less than 1.5, still more preferably 0.25 or more and less than 1.0, from the standpoint of adhesiveness to both a thermoplastic elastomer molded body and a molded body comprising an ethylene polymer.

The thermoplastic elastomer composition may contain the component (F) or may not contain the component (F). When thermoplastic elastomer composition contains the component (F), the content of the component (F) in the thermoplastic elastomer composition is preferably 1 part by weight or more and 100 parts by weight or less, more preferably 10 parts by weight or more and 80 parts by weight or less, still more preferably 20 parts by weight or more and 60 parts by weight or less with respect to 100 parts by weight of the total amount of the components (A), (B), (C) and (D).

When the thermoplastic elastomer composition contains the component (F), it is preferable that the total amount of the components (A), (B), (C), (D) and the component (F) is 80% by weight or more when the total amount of the thermoplastic elastomer composition is 100% by weight.

When the thermoplastic elastomer composition contains the component (F), the content of the component (F) in the thermoplastic elastomer composition is 1 part by weight or more and 100 parts by weight or less, more preferably 10 parts by weight or more and 80 parts by weight or less, still more preferably 20 parts by weight or more and 60 parts by weight or less with respect to 100 parts by weight of the total amount of the components (A-2), (B), (C) and (D) before melt-kneading.

When the thermoplastic elastomer composition contains the component (F), it is preferable that the total amount of the components (A-2), (B), (C), (D) and (F) before melt-kneading is 80% by weight or more when the total amount of the thermoplastic elastomer composition is 100% by weight.

The content of gel contained in the thermoplastic elastomer is preferably 5% by weight or more, more preferably 10% by weight, still more 20% by weight.

The content of gel (%) is measured by the following method.

About 1 g of the thermoplastic elastomer composition and a net basket(X) fabricated from wire mesh having a sieve opening of 400 mesh are weighted, respectively. The net basket which the thermoplastic elastomer is introduced to an extraction tube. Three hundred ml of o-xylene is introduced into a flask. The flask is heated, and o-xylene is reflexed for 24 hours to conduct extraction. After extraction, the net basket is put out the extraction tube, and dried under reduced pressure at 100° C. in a vacuum drying machine, and the net basket after drying (Y) is weighed. The weight of gel contained in the thermoplastic elastomer composition is calculated by the following formula.

weight of gel contained in the thermoplastic elastomer composition=(weight of (Y))−(weight of (X))

The weight of ash of a residue which is picked out from the net basket (Y) after extraction is measured by the following ash determination method.

Content of gel contained in the thermoplastic elastomer=((the weight of gel contained in the thermoplastic elastomer)−(the weight of ash))/(the weight of the thermoplastic elastomer)*100

(Ash Determination Method)

All resultant residue is heated from 23° C. to 850° C. at a rate of 20° C./min, and then is placed at 850° C. for 10 minutes by a thermogravimetry device, TGA Q500 type manufactured by TA instruments Co., Ltd., and then the resultant residue is weighted. The weight of the thermoplastic elastomer composition is the weight of ash.

The durometer A hardness measured according to JIS K6253 of a test piece fabricated from the thermoplastic elastomer composition by the following method is preferably 30 or more, more preferably 50 or more, still more preferably 60 or more, particularly preferably 70 or more. The durometer A hardness is preferably 99 or less, more preferably 95 or less, still more preferably 90 or less.

(Method of Fabricating Test Piece for Measurement of Durometer A Hardness)

Using an injection molding machine, the thermoplastic elastomer composition is injection-molded under conditions of a molding temperature of 220° C., a mold temperature of 50° C., an injection time of 10 seconds and a cooling time of 30 seconds, to fabricate a test piece having a length of 150 mm, a width of 90 mm and a thickness of 2.0 mm.

The method of adjusting the durometer A hardness of the thermoplastic elastomer composition to 30 or more and 99 or less includes a method in which the sum of the content of the component (A) and the content of the component (F) is adjusted to 50% by weight or more and 90% by weight or less with respect to 100% by weight of the total amount of the thermoplastic elastomer composition. When the thermoplastic elastomer composition contains no component (F), the method of adjusting the durometer A hardness of the thermoplastic elastomer composition to 30 or more and 99 or less includes a method of adjusting the content of the component (A) to 50% by weight or more and 90% by weight or less with respect to 100% by weight of the total amount of the thermoplastic elastomer composition. The larger the sum of the content of the component (A) and the content of the component (F) contained in the thermoplastic elastomer composition is, the smaller the durometer A hardness of the thermoplastic elastomer composition is.

The thermoplastic elastomer composition may contain other additives and other thermoplastic resins. The other additive includes inorganic fillers, organic fillers, fatty acid derivatives, antioxidants, weather-resistant stabilizers, ultraviolet absorbers, heat stabilizers, light stabilizers, anti-static agents, neucleating agents, pigments, adsorbents, metal chlorides, flame retardants, silicone compounds, antifriction agents, antibacterial agents, and antifungal materials.

The inorganic filler includes calcium carbonate, barium carbonate, magnesium carbonate, zinc carbonate, calcium sulfate, barium sulfate, magnesium sulfate, calcium phosphate, zinc oxide, iron oxide, calcium oxide, magnesium oxide, aluminum oxide, titanium oxide, barium oxide, magnesium hydroxide, calcium silicate, pyrophyllite clay, calcined clay, kaolin, talc, fumed silica, pyrogenic silica, precipitated silica, pulverized silica, fused silica, diatomaceous earth, mica powder, asbestos, glass fiber, glass sphere, shirasu balloon, graphite, tungsten sulfide, molybdenum sulfide, alumina, mica, zeolite, clay silicate, cement, and carbon black. Among them, calcium carbonate, barium carbonate, magnesium carbonate, zinc carbonate, calcium sulfate, barium sulfate, magnesium sulfate, zinc oxide, iron oxide, calcium oxide, magnesium oxide, aluminum oxide, titanium oxide, barium oxide, calcium silicate, pyrophyllite clay, calcined clay, kaolin, talc and carbon black are preferable. The inorganic filler may be used one kind of or two or more kinds of the inorganic fillers may be used. The shape of the inorganic filler may be various shapes such as powder, sphere, and flake. The surface of the inorganic filler may be coated with at least one fatty acid derivative selected from the group consisting of fatty acids, fatty acid esters and fatty acid metal salts.

The organic filler includes fiber, wood flour, and cellulose powder.

The fatty acid derivative includes fatty acids, fatty acid esters, fatty acid amides, and fatty acid metal salts. Two or more kinds of the fatty acid derivatives may be contained. The fatty acid includes linear saturated fatty acids such as lauric acid, myristic acid, palmitic acid, stearic acid, arachic acid, behenic acid, lignoceric acid, cerotic acid, montanic acid, and melissic acid; unsaturated fatty acids such as cetoleic acid, and sorbic acid; aromatic carboxylic acids such as benzoic acid, and phenylacetic acid. As the fatty acid ester, esters of higher fatty acids having a number of carbon atoms of 8 or more are preferable, and examples thereof include stearyl stearate, lauryl stearate, stearyl palmitate, lauryl palmitate, tristearic acid glyceride, and tripalmitic acid glyceride. The fatty acid amide includes amides of saturated fatty acids such as lauric acid amide, myristic acid amide, palmitic acid amide, stearic acid amide, and behenic acid amide, and amides of unsaturated fatty acids such as oleic acid amide, linoleic acid amide, linolenic acid amide, erucamide, arachidonic acid amide, eicosapentaenoic acid amide, and docosahexaenoic acid amide. As the fatty acid amide, unsaturated fatty acid amides are preferable, and of them, monounsaturated fatty acid amides such as erucamide, and oleic acid amide are more preferable. The fatty acid metal salt includes preferably sodium salts, potassium salts, calcium salts, aluminum salts, and zinc salts of fatty acids having a number of carbon atoms of 10 to 25.

The antioxidant includes phenol type antioxidants, sulfur-based antioxidants, phosphorus-based antioxidants, lactone type antioxidants, and vitamin-based antioxidants.

The ultraviolet absorber includes benzotriazole type ultraviolet absorbers, triazine type ultraviolet absorbers, anilide type ultraviolet absorbers, and benzophenone type ultraviolet absorbers.

The light stabilizer includes hindered amine type light stabilizers, and benzoate type light stabilizers.

The metal chloride includes iron chloride, and calcium chloride.

The antifriction agent includes fluoro polymers polyteterafluoroethylene, perfluoroalkoxy polymer resin, fluorinated ethylene-propylene copolymer (copolymer of hexafluoropropylene and tetrafluoroethylene), polyethylenetetrafluoroethylene, polyvinyl fluoride, polyethylene chloro trifluoro ethylene, polyvinylidene fluoride, polychloro trifluoro ethylene, perfluoro elastomer, and fluoro elastomer.

The content of other additives and other thermoplastic resins in the thermoplastic elastomer composition is preferably 200 parts by weight or less with respect to 100 parts by weight of the total amount of the components (A), (B), (C) and (D).

(Process for Producing Thermoplastic Elastomer Composition)

The process for producing the thermoplastic elastomer composition of includes the following methods (A), (B) and (C)

method (A): a method comprising a step (1a) of melt-kneading the components (A-2), (B), (C) and (D), method (B): a method comprising a step (1b) of melt-kneading the component (A-2), (B), (C), (D) and (E).

method (C): a method comprising a step (1c) of melt-kneading the components (A-2), (B) and (E) to obtain a composition, and a step (2c) of melt-kneading the resultant composition, the component (C) and the component (D).

In the method (A), the component (E), the component (F), other additives and other thermoplastic resins may be previously blended into the components (A-2), (B), (C) or (D), may be added thereto during the step (1a), or may be added and melt-kneaded after the step (1a).

In the method (B), the component (F), other additives and other thermoplastic resins may be previously blended into the (A-2), (B), (C), (D) or (E), may be added thereto during the step (1b), or may be added to the composition containing the component (E) and meld-kneaded after the step (1b).

In the method (C), the component (F), other additives and other thermoplastic resins may be previously blended into the components (A-2), (B) or (E), may be added thereto melt-kneading during the step (1c) or the step (2c), or may be added thereto and melt-kneaded after the step (2c).

From the standpoint of adhesiveness to both a thermoplastic elastomer molded body and a molded body comprising an ethylene polymer, the method (C) is preferable.

The melt kneading apparatus includes a mixing roll as an open apparatus, and a Bunbury mixer, an extruder, a kneader, and a continuous mixer as a closed apparatus, and the closed apparatus is preferable. All components to be kneaded may be collectively melt-kneaded, or some components may be kneaded, then, the remaining components may be added and melt-kneaded, or meld kneading may be performed once or twice more. The temperature in melt kneading is preferably 150° C. or more and 250° C. or less, and the melt kneading time is preferably 30 seconds or more and 30 minutes or less.

Components to be kneaded may be added in any order or may be added simultaneously.

The MFR of the thermoplastic elastomer composition measured according to JIS K7210 under conditions of a temperature of 230° C. and a load of 49 N is preferably 1 g/10 min or more, more preferably 5 g/10 min or more, still more preferably 10 g/10 min or more.

The density of the thermoplastic elastomer composition measured according to JIS K7112 without annealing is preferably 0.80 g/cm$^3$ or more and 1.5 g/cm$^3$ or less, more preferably 0.85 g/cm$^3$ or more and 1.2 g/cm$^3$ or less, still more preferably 0.88 g/cm$^3$ or more and 1.0 g/cm$^3$ or less.

The breaking elongation of a molded body comprising the thermoplastic elastomer composition measured according to JIS K6251 using a test piece of JIS No. 3 at a tensile rate of 200 mm/min is preferably 300% or more, more preferably 400% or more, still more preferably 500% or more.

A test piece of the thermoplastic is fabricated by the following method. The compression set measured according to JIS K6262 is preferably 70% or less, more preferably 60% or less, still more preferably 50% or less. In the method of measurement of compression set, specifically, a test piece is placed at 23° C. for 24 hours, then, compressed at a compressibility of 25% with a compression device, and then immediately the test piece compressed with the compression device is put into a constant-temperature bath at 70° C. and left for 22 hours. Thereafter, the test piece compressed with compression device is removed from the constant-temperature bath, and the compression device immediately is removed from the test piece compressed with the compression device. The resultant test piece is left in a constant-temperature room at 23° C. for 30 minutes, then, the thickness of the test piece is measured, and the compression set is calculated according the formula (1) of JIS K6262.

(Method of Fabrication of Test Piece for Measurement of Compression Set)

Using an injection molding machine, the thermoplastic elastomer composition is injection-molded under conditions of a molding temperature of 220° C., a mold temperature of 50° C., an injection time of 10 seconds and a cooling time of 30 seconds, to fabricate a test piece having a length of 150 mm, a width of 90 mm and a thickness of 2.0 mm.

By molding the thermoplastic elastomer composition, a molded body comprising the thermoplastic elastomer composition can be obtained.

The process for producing a molded body comprising the thermoplastic elastomer composition includes known molding methods such as extrusion molding, calender molding, and injection molding using usual apparatuses used for molding of a thermoplastic resin.

The compression set of a molded body comprising the thermoplastic elastomer composition is preferably 70% or less, more preferably 60% or less, still more preferably 50% or less. The compression set of a molded body comprising the thermoplastic elastomer composition is determined by measuring a test piece cut-out from a molded body comprising the thermoplastic elastomer composition according to JIS K6262. Specifically, the test piece is placed at a temperature of 23° C. for 24 hours, then, compressed at a compressibility of 25% with a compression device, and then immediately the test piece compressed with the compression device is put into a constant-temperature bath at 70° C., and left for 22 hours. Thereafter, the test piece compressed with compression device is removed from the constant-temperature bath, and the compression device immediately is removed from the test piece compressed with the compression device. The resultant test piece is left in a constant-temperature room at 23° C. for 30 minutes, then, the thickness of the test piece is measured, and the compression set is calculated according to the formula (1) of JIS K6262.

The molded body comprising the thermoplastic elastomer composition can be used as a material of automobile parts such as weather strip, ceiling material, interior sheet, bumper mall, side mall, air spoiler, air duct hose, cup holder, side brake grip, shift knob cover, sheet adjustment knob, flapper door seal, wire harness grommet, rack-and-pinion boot, suspension cover boot, glass guide, inner belt line seal, roof guide, trunk lid seal, molded quarter wind gasket, corner molding, glass encapsulation, food seal, glass run channel, secondary seal, and various packings; civil engineering and building material parts such as waterproof material, joint material, and architectural window frame; sporting goods such as golf club, and tennis racket grips; industrial parts such as hose tube, and gasket; home electronics parts such as hose, and packings), medical equipment parts, electrical wire, and miscellaneous goods, and it is preferably used as a weather strip.

EXAMPLES

The present invention will be illustrated further specifically based on examples below, but the present invention is not limited to these examples.
Physical Property Measurement Method
(1) Mooney Viscosity ($ML_{1-4}$ 100° C.)
The Mooney viscosity of the component (A) was measured according to JIS K6300 at a temperature of 100° C.
(2) Melt Flow Rate (MFR, Unit: g/10 Min)
MFR of the component (A), MFR of a component (C) and MFR of the component (D) were measured according to JIS K7210 under conditions of a temperature of 190° C. and a load of 21.18 N.
MFR of the component (B) was measured according to JIS K7210 under conditions of a temperature of 230° C. and a load of 21.18 N.
MFR of a thermoplastic elastomer composition was measured according to JIS K7210 under conditions of a temperature of 230° C. and a load of 49 N.
(3) Contents of Monomer Unit Derived from Ethylene, Monomer Unit Derived from Propylene and Monomer Unit Derived from 5-Ethylidene-2-Norbornene (Unit: % by Weight)
The contents were measured by infrared spectroscopy (IR method). Specifically, an ethylene-propylene-5-ethylidene-2-norbornene copolymer was molded into a film having a thickness of about 0.5 mm, then, using an infrared spectrophotometer, the intensity of the peak (absorption peak at 1688 $cm^{-1}$) derived from 5-ethylidene-2-norbornene of the film was measured, and the content of a monomer unit derived from 5-ethylidene-2-norbornene in the copolymer was calculated. Next, an ethylene-propylene-5-ethylidene-2-norbornene copolymer was newly molded into a film having a thickness of about 0.1 mm, and the infrared absorption spectrum of the film was measured using an infrared spectrophotometer, and the content of a monomer unit derived from ethylene and the content of a monomer unit derived from propylene were calculated according to the method described in a literature (Die Makromolekulare Chemie, 177, 461 (1976) written by Mc Rae, M. A., Madam S, W. F., et al.).
(4) Injection Molding
Using an injection molding machine type IS100EN-3A manufactured by Toshiba Machine Co., Ltd., a thermoplastic elastomer composition was injection-molded under conditions of a molding temperature of 220° C., a mold temperature of 50° C., an injection time of 10 seconds and a cooling time of 30 seconds, to obtain an injection-molded body having a length of 150 mm, a width of 90 mm and a thickness of 2.0 mm.
(5) Durometer A Hardness
The durometer A hardness of the injection-molded body produced in the above (4) was measured according to JIS K6253.
(6) Compression Set
The compression set of the injection-molded body produced in the above (4) was measured according to JIS K6262. Specifically, the injection-molded body was placed at 23° C. for 24 hours, then, compressed at a compressibility of 25% with a compression device. Immediately, the compression device having the injection-molded body was put into a constant-temperature oven and left in the constant-temperature oven for 22 hours at 70° C. Thereafter, the injection-molded body compressed with compression device was removed from the constant-temperature oven, and the compression device immediately was removed from the test piece compressed with the compression device. The resultant injection-molded body was left in a constant-temperature room at 23° C. for 30 minutes, then, the thickness of the injection-molded body was measured, and the compression set was calculated according the formula (1) of JIS K6262.
(7) Adhesiveness
[Adhesiveness to Thermoplastic Elastomer Molded Body]
A thermoplastic elastomer molded body obtained in [Reference Example 1] (hereinafter, referred to as molded body (X) in some case) was used as an adherend. The molded body (X) was attached to a metallic mold for injection molding with a double-faced adhesive tape.
Using an injection molding machine type IS100EN-3A manufactured by Toshiba Machine Co., Ltd., each of thermoplastic elastomer compositions produced in the examples was injection-molded under conditions of a molding temperature of 250° C. and a mold temperature of 50° C., to obtain a molded body (Z1) in which the molded body (X) and the injection-molded body comprising the thermoplastic elastomer composition obtained in each example were welded. The injection direction of the molded body (X) was vertical to the welding plane.
The molded body (Z1) was punched out with JIS No. 3 dumbbell to fabricate a test piece comprising the welding plane. The injection direction of the test piece was vertical to the welding plane. The welding plane was located in the middle of the test piece in the longer direction.
The test piece was subject to a peeling test at a tensile rate of 200 mm/min, and strength of adhesiveness of the molded body (Z1) was simultaneously measured. The peeled surface of the molded body (X) of the peeled test piece was visually observed. When a part of the injection-molded body comprising the thermoplastic elastomer composition obtained in each example was adhered on the peeled surface and the adhesion area thereof was 50% or more with respect to 100% of the total area of the peeled surface, it was evaluated that adhesiveness was good (hereinafter, referred to as "G" in some case). When a part of the injection-molded body comprising the thermoplastic elastomer composition obtained in each example was adhered on the peeled surface and the adhesion area thereof was less 50% with respect to 100% of the total area of the peeled surface or when the injection-molded body portion comprising the thermoplastic elastomer composition obtained in each example was not adhered to the peeled surface, it was evaluated that adhesiveness was bad (hereinafter, referred to as "B" in some case).

Strength of welding of the molded body (Z1) is preferably 3.0 MPa or more, more preferably 3.3 MPa or more.

[Adhesiveness to Molded Body Comprising Ethylene Polymer]

A molded body comprising an ethylene polymer obtained in [Reference Example 2] (hereinafter, referred to as molded body (Y) in some case) was used as an adherend. The molded body (Y) was attached to a metallic mold for injection molding with a double-faced adhesive tape.

Using an injection molding machine type IS100EN-3A manufactured by Toshiba Machine Co., Ltd., each of thermoplastic elastomer compositions produced in an example described later was injection-molded under conditions of a molding temperature of 250° C. and a mold temperature of 50° C., to obtain a molded body (Z2) in which the molded body (Y) and the injection-molded body comprising a thermoplastic elastomer composition obtained in each example were meld-adhered.

The molded body (Z2) was punched out with JIS No. 3 dumbbell to fabricate a test piece comprising the welding plane. The injection direction of the test piece was vertical to the welding plane. The test piece was subjected to a peeling test at a tensile rate of 200 mm/min, and strength of adhesiveness of the molded body (Z2) was simultaneously measured. The peeled surface of the molded body (Y) of the peeled test piece was visually observed. When a part of the injection-molded body comprising the thermoplastic elastomer composition obtained in each example was adhered on the peeled surface and the adhesion area thereof was 50% or more with respect to 100% of the total area of the peeled surface, it was evaluated that adhesiveness was good (hereinafter, referred to as "G" in some case). When a part of the injection-molded body comprising the thermoplastic elastomer composition obtained in each example was adhered on the peeled surface and the adhesion area thereof was less than 50% with respect to 100% of the total area of the peeled surface or when the injection-molded body portion comprising the thermoplastic elastomer composition obtained in each example was not adhered to the peeled surface, it was evaluated that adhesiveness was bad (hereinafter, referred to as "B" in some case).

Strength of adhesiveness of the molded body (Z2) is preferably 3.0 MPa or more, more preferably 3.3 MPa or more.

Reference Example 1

(Preparation of Molded Body (X))

"Santoprene 121-73W175", a thermoplastic elastomer manufactured by ExxonMobil, was injection-molded by the method described in the above (4), to obtain an injection-molded body of having a length of 150 mm, a width of 90 mm and a thickness of 2.0 mm. Next, the injection-molded body was cut with a cutter into a molded body (X) having a length of 30 mm, a width of 90 mm and a thickness of 2.0 mm.

Reference Example 2

(Preparation of Molded Body (Y))

"M6901", an ethylene polymer manufactured by Keiyo Polyethylene Co., Ltd., was injection-molded by the method described in the above (4), to obtain an injection-molded body having a length of 150 mm, a width of 90 mm and a thickness of 2.0 mm. Next, the injection-molded body was cut with a cutter into the molded body (Y) having a length of 30 mm, a width of 90 mm and a thickness of 2.0 mm.

(8) Crystal Melting Heat Quantity

The crystal melting heat quantity in the temperature range of 110° C. or more and 125° C. or less was determined as the melting heat obtained by analyzing, by a method according to JIS K7122-1987, a part of the melting curve measured by the differential scanning calorimetry in the temperature range of 110° C. or more and 125° C. or less.

The crystal melting peak temperature in the temperature range of 110° C. or more and 125° C. or less was determined as the top temperature of the melting peak obtained by analyzing a part in the temperature range of 110° C. or more and 125° C. or less of the melting curve measured by the following differential scanning calorimetry by a method according to JIS K7121-1987.

The glass transition temperature was determined as the intermediate point glass transition temperature obtained by analyzing the melting curve measured by the following differential scanning calorimetry by a method according to JIS K7121-1987.

[Differential Scanning Calorimetry Method]

Using a differential scanning calorimeter, an aluminum pan having about 5 mg of an enclosed sample is (1) kept at 150° C. for 5 minutes, then, (2) cooled from 150° C. to −50° C. at a rate of 5° C./min, then, (3) kept at −50° C. for 5 minutes, then, (4) heated from −50° C. to 150° C. at a rate of 5° C./min, under a nitrogen atmosphere. The differential scanning calorimetry curve obtained by calorimetry in the step (4) is the melting curve.

Materials used in examples are as described below.

Composition Comprising Component (A-2) and Component (F))

((A-2)1+F1): Composition obtained by adding 100 parts by weight of paraffinic mineral oil (F1) manufactured by Idemitsu Kosan Co., Ltd., trade name "PW-380" to 100 parts by weight of ethylene-propylene-5-ethylidene-2-norbornene copolymer ((A-2)1)

Mooney viscosity ($ML_{1+4}$ 100° C.) of ((A-2)1+F1)=53, content of monomer unit derived from ethylene in ((A-2)1) =62.0% by weight, content of monomer unit derived from propylene in ((A-2)1)=28.1% by weight, content of monomer unit derived from 5-ethylidene-2-norbornene in ((A-2)1)=9.9% by weight, gel fraction of ((A-2)1)=0% by weight Component (B)

(B1): propylene homopolymer manufactured by Sumitomo Chemical Co., Ltd., trade name "Norbrene Y501N"

MFR (230° C., 21.18 N)=13 g/10 min (B2): heterophasic propylene polymerization material manufactured by Sumitomo chemical Co., Ltd., trade name "Norbrene AZ864"

MFR (230° C., 21.18 N)=30 g/10 min

Component (C)

(C1): trade name "Engage XLT8677" manufactured by The Dow Chemical Company crystal melting peak temperature: 119° C., crystal melting heat quantity in the temperature range of 110° C. or more and 125° C. or less: 37 J/g, MFR (190° C., 21.18 N): 0.5 g/10 min, glass transition temperature (DSC method): −67° C., density: 0.87 g/cm³

(C2): trade name "INFUSE D9007" manufactured by The Dow Chemical Company crystal melting peak temperature: 119° C., crystal melting heat quantity in the temperature range of 110° C. or more and 125° C. or less: 37 J/g, MFR (190° C., 21.18 N): 0.5 g/10 min, glass transition temperature (DSC method): −67° C., density: 0.87 g/cm³

Component (D)
(D1): high density polyethylene manufactured by Keiyo Polyethylene Co., Ltd., trade name "M6901"
MFR (190° C., 21.18 N)=13 g/10 min, density: 0.962 g/cm$^3$
Content of monomer unit derived from ethylene in (D1) is over 90% by weight.
(D2): low density polyethylene manufactured by Sumitomo Chemical Co., Ltd., trade name "Sumicacene-L GA801"
MFR (190° C., 21.18 N)=20 g/10 min, density: 0.920 g/cm$^3$
Content of monomer unit derived from ethylene in (D1) is over 90% by weight.
(D3): high density polyethylene manufactured by Keiyo Polyethylene Co., Ltd., trade name "M8500"
MFR (190° C., 21.18 N)=5 g/10 min, density: 0.962 g/cm$^3$
Content of monomer unit derived from ethylene in (D1) is over 90% by weight.
Component (E)
(E1+F2): trade name "APO-10DL manufactured by Kayaku Akuzo Corporation
(composition comprising 10% by weight of 2,5-dimethyl-2,5-di(tert-butylperoxy)hexane (E1) and 90% by weight of paraffinic mineral oil (F2) (manufactured by Idemitsu Kosan Co., Ltd., trade name "PW-100") when the total amount of (E1) and (F2) is 100% by weight)
fatty acid amide: manufactured by Nippon Fine Chemical Co., Ltd., trade name "Neutron-S" (erucamide)
crosslinking aid: manufactured by Sumitomo Chemical Co., Ltd., trade name "Sumifine BM" (N,N'-m-phenylenebismaleimide)
antioxidant: manufactured by BASF Japan, trade name "Irganox 1010"

In the following examples and comparative examples, thermoplastic elastomer compositions were produced by melt-kneading materials in the rage of 200° C.±20° C. for the range of 40 seconds±20 seconds using a twin screw kneading extruder (TEX-44HCT manufactured by The Japan Steel Works, Ltd.), respectively.

Example 1

One hundred parts by weight of ((A-2)1+F1), 25% by weight of (B1), 4.0 parts by weight of (E1+F2), 0.1 part by weight of Sumifine BM, 0.5 parts by weight of Neutron-S and 0.1 part by weight of Irganox 1010 were meld-kneaded, to produce a thermoplastic elastomer composition precursor. The resultant thermoplastic elastomer composition precursor, 12.5 parts by weight of (C1) and 12.5 parts by weight of (D1) were meld-kneaded, to produce a thermoplastic elastomer composition. The gel fraction of the component (A) in the resultant thermoplastic elastomer composition is 84% by weight. The gel content of the resultant thermoplastic elastomer is 27%. The resultant thermoplastic elastomer composition was injection-molded by the method described in the above (4), to obtain a molded body. The results of measurement of physical properties of the molded body were shown in Table 1. The resultant thermoplastic elastomer composition was injection-molded by the above-described molding method described in the above (7), to obtain a molded body (Z1) and a molded body (Z2). Adhesiveness described in the above (7) using each of a molded body (Z1) and a molded body (Z2) were evaluated and the results of evaluation of adhesiveness were shown in Table 1.

Examples 2

Thermoplastic elastomer compositions were produced according to the same manner as that of example 1, except that components and/or contents thereof were set as shown in Table 1. The gel fraction of the component (A) in the resultant thermoplastic elastomer composition is 81% by weight. The gel content of the resultant thermoplastic elastomer is 27%. The resultant thermoplastic elastomer compositions were injection-molded by the method described in the above (4), to obtain molded bodies. The results of measurement of physical properties of the molded bodies were shown as in Table 1.

The resultant thermoplastic elastomer compositions were injection-molded by the molding method described in the above (7), to obtain molded bodies (Z1) and molded bodies (Z2). Adhesiveness described in the above (7) using each of a molded body (Z1) and a molded body (Z2) was evaluated and the results of evaluation of adhesiveness to the molded body (X) and adhesiveness to the molded body (Y) were shown in Table 1.

Example 3

Thermoplastic elastomer compositions were produced according to the same manner as that of example 1, except that components and/or contents thereof ere set as shown in Table 1. The gel fraction of the component (A) in the resultant thermoplastic elastomer composition is 86% by weight. The gel content of the resultant thermoplastic elastomer is 27%. The resultant thermoplastic elastomer compositions were injection-molded by the method described in the above (4), to obtain molded bodies. The results of measurement of physical properties of the molded body were shown as in Table 1.

The resultant thermoplastic elastomer compositions were injection-molded by the molding method described in the above (7), to obtain molded bodies (Z1) and molded bodies (Z2). Adhesiveness described in the above (7) using each of a molded body (Z1) and a molded body (Z2) was evaluated and the results of evaluation of adhesiveness to the molded body (X) and adhesiveness to the molded body (Y) were shown in Table 1.

Example 4

Ninety four parts by weight of ((A-2)1+F1), 24% by weight of (B1), 6% by weight of (C1), 24% by weight of (D1), 3.8 parts by weight of (E1+F2), 0.1 part by weight of Sumifine BM, 0.5 parts by weight of Neutron-S) and 0.1 part by weight of Irganox 1010 were meld-kneaded, to produce a thermoplastic elastomer composition. The resultant thermoplastic elastomer composition was injection-molded by the method described in the above (4), to obtain a molded body. The results of measurement of physical properties of the molded body were shown as in Table 1. The resultant thermoplastic elastomer composition was injection-molded by the molding method described in the above (7), to obtain a molded body (Z1) and a molded body (Z2). Adhesiveness described in the above (7) using each of a molded body (Z1) and a molded body (Z2) were evaluated and the results of evaluation of adhesiveness were shown in Table 1.

Examples 5 to 9, and Comparative Example 1, 2, 7 and 8

Thermoplastic elastomer compositions were produced according to the same manner as that of example 1, except that components and/or contents thereof were set as shown in table 1, 2, 3 and 4, respectively. Each of the resultant thermoplastic elastomer compositions were injection-molded by the method described in the above (4), to obtain molded bodies. The results of measurement of physical properties of each of the molded body were shown as in Table 1, 2, 3 and 4. Each of the resultant thermoplastic elastomer compositions were injection-molded by the molding method described in the above (7), to obtain molded bodies (Z1) and molded bodies (Z2). Adhesiveness described in the above (7) using each of a molded body (Z1) and a molded body (Z2) were evaluated and the results of evaluation of adhesiveness were shown in Table 1, 2, 3 and 4.

Comparative Example 3

One hundred fourteen parts by weight of ((A-2)1+F1), 29% by weight of (B1), 4.6 parts by weight of (E1+F2), 0.1 part by weight of Sumifine BM, 0.5 parts by weight of Neutron-S and 0.1 part by weight of Irganox 1010 were meld-kneaded, to produce a thermoplastic elastomer composition precursor. The resultant thermoplastic elastomer composition precursor and 14% by weight of (D1) ( ) were meld-kneaded, to produce a thermoplastic elastomer composition. The thermoplastic elastomer composition was injection-molded by the method described in the above (4), to obtain a molded body. The results of measurement of physical properties of each of the molded body were shown as in Table 3. The resultant thermoplastic elastomer composition was injection-molded by the molding method described in the above (7), to obtain a molded body (Z1) and a molded body (Z2). Adhesiveness described in the above (7) using each of a molded body (Z1) and a molded body (Z2) were evaluated and the results of evaluation of adhesiveness were shown in Table 3.

Comparative Example 4

One hundred fourteen parts by weight of ((A-2)1+F1) ( ), 29% by weight of (B1), 4.6 parts by weight of (E1+F2), 0.1 part by weight of Sumifine BM, 0.5 parts by weight of Neutron-S and 0.1 part by weight of Irganox 1010 were meld-kneaded, to produce a thermoplastic elastomer composition precursor. The resultant thermoplastic elastomer composition precursor and 14% by weight of (C1) were meld-kneaded, to produce a thermoplastic elastomer composition. The resultant thermoplastic elastomer composition was injection-molded by the method described in the above (4), to obtain a molded body. The results of measurement of physical properties of the molded body were shown as in Table 3. The resultant thermoplastic elastomer composition was injection-molded by the molding method described in the above (7), to obtain a molded body (Z1) and a molded body (Z2). Adhesiveness described in the above (7) using each of a molded body (Z1) and a molded body (Z2) were evaluated and the results of evaluation of adhesiveness were shown in Table 3.

Comparative Example 5

One hundred thirty four parts by weight of ((A-2)1+F1), 33% by weight of (B1), 5.3 parts by weight of (E1+F2), 0.1 part by weight of Sumifine BM, 0.5 parts by weight of Neutron-S and 0.1 part by weight of Irganox 1010 were meld-kneaded, to produce a thermoplastic elastomer composition. The resultant thermoplastic elastomer composition was injection-molded by the method described in the above (4), to obtain a molded body. The results of measurement of physical properties of the molded body were shown as in Table 4. The resultant thermoplastic elastomer composition was injection-molded by the molding method described in the above (7), to obtain a molded body (Z1) and a molded body (Z2). Adhesiveness described in the above (7) using each of a molded body (Z1) and a molded body (Z2) were evaluated and the results of evaluation of adhesiveness were shown in Table 4.

Comparative Example 6

Thirty percent by weight of (B1), 30% by weight of (C1), 40% by weight of (D1), 0.5 parts by weight of Neutron-S and 0.1 parts by weight of Irganox 1010 were meld-kneaded, to produce the thermoplastic elastomer composition. The resultant thermoplastic elastomer was injection-molded by the method described in the above (4). The results of measurement of physical properties of the molded body were shown as in Table 4. The resultant thermoplastic elastomer compositions were injection-molded by the molding method described in the above (7), to obtain molded bodies (Z1) and molded bodies (Z2). Adhesiveness described in the above (7) using each of a molded body (Z1) and a molded body (Z2) were evaluated and the results of evaluation of adhesiveness were shown in Table 4.

TABLE 1

| | | Example | | | | |
|---|---|---|---|---|---|---|
| | | 1 | 2 | 3 | 4 | 5 |
| (A – 2)1 + F1 | | 100 | 106 | 94 | 94 | 106 |
| B1 | % by weight | 25 | 27 | 24 | 24 | 27 |
| B2 | | | | | | |
| C1 | % by weight | 12.5 | 7 | 6 | 6 | 7 |
| C2 | | | | | | |
| D1 | % by weight | 12.5 | 13 | 24 | 24 | |
| D2 | | | | | | 13 |
| D3 | | | | | | |
| E1 + F2 | | 4.0 | 4.3 | 3.8 | 3.8 | 4.3 |
| Sumifine BM | parts by weight | 0.1 | 0.1 | 0.1 | 0.1 | 0.1 |
| Neutron-S | | 0.5 | 0.5 | 0.5 | 0.5 | 0.5 |
| Irganox 1010 | | 0.1 | 0.1 | 0.1 | 0.1 | 0.1 |
| MFR of thermoplastic elastomer composition (230° C., 49N) | g/10 min | 22 | 17 | 21 | 4.2 | 19 |
| hardness (shore A) | — | 80 | 82 | 87 | 87 | 79 |
| breaking elongation | % | 550 | 530 | 550 | 360 | 540 |
| compression set | % | 36 | 36 | 36 | 35 | 44 |
| Adhesiveness (molded body (Z1)) | | G | G | G | G | G |
| adhesion strength (molded body (Z1)) | MPa | 3.5 | 3.8 | 3.4 | 3.8 | 3.7 |
| Adhesiveness (molded body (Z2)) | | G | G | G | G | G |
| adhesion strength (molded body (Z2)) | MPa | 3.3 | 3.3 | 3.7 | 3.8 | 3.3 |

TABLE 2

| | | Example | | | |
|---|---|---|---|---|---|
| | | 6 | 7 | 8 | 9 |
| (A-2)1 + F1 | | 68 | 76 | 94 | 106 |
| B1 | % by weight | 14 | | 24 | 27 |
| B2 | | | 32 | | |
| C1 | % by weight | 20 | 15 | 6 | |
| C2 | | | | | 7 |

TABLE 2-continued

|  |  | Example | | | |
| --- | --- | --- | --- | --- | --- |
|  |  | 6 | 7 | 8 | 9 |
| D1 | % by weight | 32 | 15 |  | 13 |
| D2 |  |  |  |  |  |
| D3 |  |  |  |  |  |
| E1 + F2 |  | 4.0 | 3.2 | 3.8 | 4.3 |
| Sumifine BM | parts by weight | 0.1 | 0.1 | 0.1 | 0.1 |
| Neutron-S |  | 0.5 | 0.5 | 0.5 | 0.5 |
| Irganox 1010 |  | 0.1 | 0.1 | 0.1 | 0.1 |
| MFR of thermoplastic elastomer composition (230° C., 49N) | g/10 min | 16 | 43 | 14 | 17 |
| hardness (shore A) | — | 89 | 86 | 88 | 82 |
| breaking elongation | % | 580 | 540 | 540 | 530 |
| compression set | % | 35 | 42 | 35 | 36 |
| Adhesiveness (molded body (Z1)) |  | G | G | G | G |
| adhesion strength (molded body (Z1)) | MPa | 3.0 | 3.1 | 3.6 | 3.8 |
| Adhesiveness (molded body (Z2)) |  | G | G | G | G |
| adhesion strength (molded body (Z2)) | MPa | 3.1 | 3.1 | 3.7 | 3.3 |

TABLE 3

|  |  | Comparative Example | | | |
| --- | --- | --- | --- | --- | --- |
|  |  | 1 | 2 | 3 | 4 |
| (A-2)1 + F1 |  | 106 | 106 | 114 | 114 |
| B1 | % by weight | 27 | 27 | 29 | 29 |
| B2 |  |  |  |  |  |
| C1 | % by weight | 13.3 | 13.3 |  | 14 |
| C2 |  |  |  |  |  |
| D1 | % by weight | 6.7 |  | 14 |  |
| D2 |  |  | 6.7 |  |  |
| D3 |  |  |  |  |  |
| E1 + F2 |  | 4.3 | 4.3 | 4.6 | 4.6 |
| Sumifine BM | parts by weight | 0.1 | 0.1 | 0.1 | 0.1 |
| Neutron-S |  | 0.5 | 0.5 | 0.5 | 0.5 |
| Irganox 1010 |  | 0.1 | 0.1 | 0.1 | 0.1 |
| MFR of thermoplastic elastomer composition (230° C., 49N) | g/10 min | 23 | 25 | 11 | 28 |
| hardness (shore A) | — | 77 | 75 | 84 | 74 |
| breaking elongation | % | 570 | 570 | 560 | 580 |
| compression set | % | 38 | 41 | 37 | 41 |
| Adhesiveness (molded body (Z1)) |  | G | G | G | G |
| adhesion strength (molded body (Z1)) | MPa | 3.6 | 3.5 | 4.7 | 3.6 |
| Adhesiveness (molded body (Z2)) |  | B | B | B | B |
| adhesion strength (molded body (Z2)) | MPa | 2.7 | 2.4 | 2.9 | 2.3 |

TABLE 4

|  |  | Comparative Example | | | |
| --- | --- | --- | --- | --- | --- |
|  |  | 5 | 6 | 7 | 8 |
| (A-2)1 + F1 |  | 134 |  | 114 | 99.8 |
| B1 | % by weight | 33 | 30 | 29 | 24.8 |
| B2 |  |  |  |  |  |
| C1 | % by weight |  | 30 |  | 14 |
| C2 |  |  |  |  |  |
| D1 | % by weight |  | 40 | 14 |  |
| D2 |  |  |  |  |  |
| D3 |  |  |  |  |  |
| E1 + F2 |  | 5.3 |  | 4.6 | 4.0 |
| Sumifine BM | parts by weight | 0.1 |  | 0.1 | 0.1 |
| Neutron-S |  | 0.5 | 0.5 | 0.5 | 0.5 |
| Irganox 1010 |  | 0.1 | 0.1 | 0.1 | 0.1 |
| MFR of thermoplastic elastomer composition (230° C., 49N) | g/10 min | 21 | 30 | 9 | 16 |
| hardness (shore A) | — | 78 | 100 | 90 | 88 |
| breaking elongation | % | 660 | 460 | 510 | 550 |
| compression set | % | 42 | 66 | 37 | 37 |
| Adhesiveness (molded body (Z1)) |  | G | G | G | G |
| adhesion strength (molded body (Z1)) | MPa | 4.5 | 4.3 | 4.1 | 3.9 |
| Adhesiveness (molded body (Z2)) |  | B | B | B | B |
| adhesion strength (molded body (Z2)) | MPa | 2.0 | No adhesion | 2.7 | 2.7 |

The invention claimed is:

1. A thermoplastic elastomer composition comprising components (A), (B), (C) and (D), wherein a gel fraction of the component (A) is over 10% by weight, and a weight ratio of the component (C) to the component (D) is 0.1 or more and less than 2;

the component (A) is an ethylene random copolymer comprising a monomer unit derived from ethylene in amount of 50% by weight or more and 90% by weight or less when-a total amount of the ethylene random copolymer is 100% by weight and a monomer unit derived from at least one monomer selected from the group consisting of α-olefins having a number of carbon atoms of 3 or more and 10 or less;

the component (B) is a polymer comprising over 50% by weight and 100% by weight or less of a monomer unit derived from propylene when a total amount of the polymer is 100% by weight;

the component (C) is a copolymer comprising an ethylene polymerization block and an ethylene-α-olefin copolymerization block; and the component (D) is an ethylene polymer comprising over 90% by weight and 100% by weight or less of a monomer unit derived from ethylene when a total amount of the ethylene polymer is 100% by weight.

2. A thermoplastic elastomer composition produced by melt-kneading the following components (A-2), (B) and (E) to obtain a composition, and then melt-kneading the composition and the following components (C) and (D), wherein the component (A-2) is an ethylene random copolymer comprising a monomer unit derived from ethylene in amount of 50% by weight or more and 90% by weight or less when a total amount of the ethylene random copolymer is 100% by weight and a monomer unit derived from at least one monomer selected from the group consisting of α-olefins having a number of carbon atoms of 3 or more and 10 or less, wherein a gel fraction of the ethylene random copolymer is 10% by weight or less;

the component (B) is a polymer comprising over 50% by weight and 100% by weight or less of a monomer unit derived from propylene when a total amount of the polymer is 100% by weight;

the component (E) is a crosslinking agent;

the component (C) is an olefin-based block copolymer comprising an ethylene polymerization block and an ethylene-α-olefin copolymerization block; and the component (D) is an ethylene polymer comprising over 90% by weight and 100% by weight or less of a monomer unit derived from ethylene when a total amount of the ethylene polymer is 100% by weight.

3. A thermoplastic elastomer composition according to claim 1, wherein a weight of gel thermoplastic elastomer is 5% or more.

4. A process for producing a thermoplastic elastomer composition, comprising the following steps (1) and (2), wherein the step (1) is a step of melt-kneading the following components (A-2), (B) and (E) to obtain a composition;

the step (2) is a step of melt-kneading the composition produced by the step (1) and the following components (C) and (D) to obtain the thermoplastic elastomer composition, wherein the component (A-2) is an ethylene random copolymer comprising a monomer unit derived from ethylene in an amount of 50% by weight or more and 90% by weight or less when a total amount of the ethylene random copolymer is 100% by weight and a monomer unit derived from at least one monomer selected from the group consisting of α-olefins having a number of carbon atoms of 3 or more and 10 or less, wherein a gel fraction of the ethylene random copolymer is 10% by weight or less;

the component (B) is a polymer comprising over 50% by weight and 100% by weight or less of a monomer unit derived from propylene when a total amount of the polymer is 100% by weight;

the component (E) is a crosslinking agent;

the component (C) is an olefin-based block copolymer comprising an ethylene polymerization block and an ethylene-α-olefin copolymerization block; and the component (D) is an ethylene polymer comprising over 90% by weight and 100% by weight or less of a monomer unit derived from ethylene when a total amount of the ethylene polymer is 100% by weight.

5. A molded body comprising the thermoplastic elastomer composition according to claim 1.

6. An automobile part comprising the molded body according to claim 5.

* * * * *